United States Patent [19]
Lajovic

[11] 3,805,358
[45] Apr. 23, 1974

[54] ARTICLE COVERING APPARATUS
[75] Inventor: Dusan S. Lajovic, Smithfield, New South Wales, Australia
[73] Assignee: Colgate-Palmolive Company, New York, N.Y.
[22] Filed: Oct. 6, 1972
[21] Appl. No.: 295,537

Related U.S. Application Data
[63] Continuation of Ser. No. 194,253, Nov. 1, 1971, abandoned, which is a continuation-in-part of Ser. No. 75,840, Sept. 28, 1970, abandoned.

[30] Foreign Application Priority Data
Oct. 13, 1969  Austria......................... 62213/69
Sept. 25, 1970  Austria........................... 2651/70
Oct. 2, 1969  Austria......................... 61800/69

[52] U.S. Cl............................................. 29/208 B
[51] Int. Cl............................................ B23p 19/04
[58] Field of Search.. 29/208 B, 447, 208 R, 211 D, 29/208 D

[56]  References Cited
UNITED STATES PATENTS
3,024,523  3/1962  Donaldson ...................... 29/208 B
3,523,052  8/1970  Bolen............................ 156/521

Primary Examiner—Thomas H. Eager
Attorney, Agent, or Firm—Strauch, Nolan, Neale, Nies & Kurz

[57]  ABSTRACT

Apparatus for applying inserts of flexible thermoplastic material to surround the externally screw threaded metal neck of a dispensing tube comprises a rotatable turntable for mounting a series of tubes and presenting them at an insert applying station having means for advancing the tubular open end of a continuous length of thermoplastic tubing to surround said neck and cutting means for severing the leading length of tubing to provide an insert separated from the continuous tubing length and in position to be secured around the tube neck.

19 Claims, 3 Drawing Figures 3,805,358
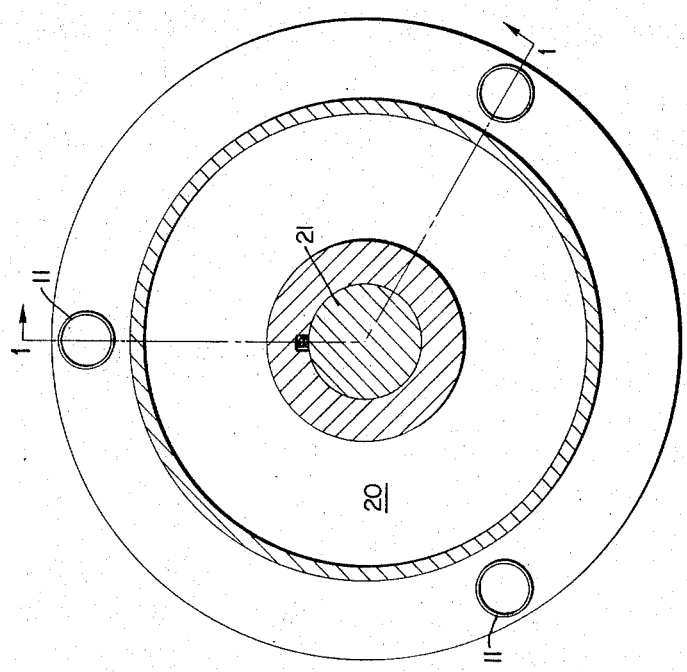
FIG. 2
FIG. 3
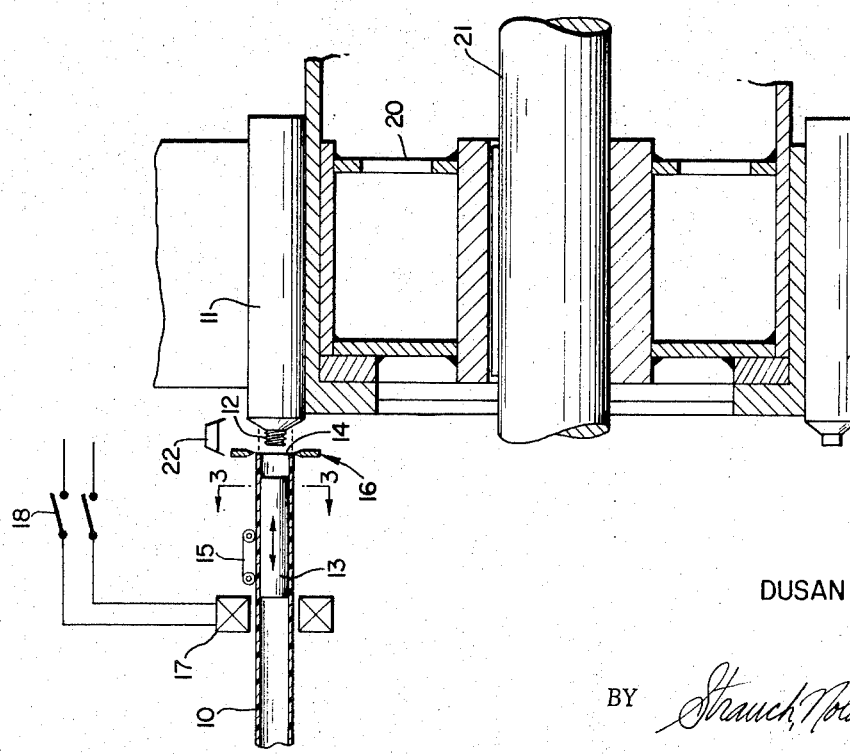
FIG. 1
INVENTOR
DUSAN S. LAJOVIC
BY *Strauch, Nolan, Neale, Nies & Kurz*
ATTORNEYS

ARTICLE COVERING APPARATUS

This is a continuation of my application Ser. No. 194,253 filed Nov. 1, 1971 (now abandoned) which in turn was a continuation-in-part of my application Ser. No. 75,840, filed Sept. 28, 1970 for PLASTIC SCREW THREAD ARTICLE AND METHOD OF MANUFACTURE, now abandoned.

ARTICLE COVERING APPARATUS

This invention relates to feeding and cutting devices for tubing and more particularly to a device adapted to feed intermittently, onto a substantially cylindrical surface, discrete lenghts of continuously supplied plastic tubing.

BRIEF DESCRIPTION OF DRAWINGS

FIG. 1 is a partially diagrammatic and partially sectional view substantially on line 1—1 in FIG. 2, and illustrating the invention according to a preferred embodiment;

FIG. 2 is an end view in section showing the turntable mounting the tubes to be modified.

FIG. 3 is a section substantially on line 3—3 of FIG. 1.

PREFERRED EMBODIMENTS

In the production of such articles as aluminum toothpaste tubes 11, which are deformable containers each having a rigid externally screw-threaded neck 12 formed at one end, it is desirable to be able to install a plastic insert which covers and conforms snugly with the screw threads upon said neck. It is desirable also to form said inserts from short lengths which are severed from a relatively long continuous length of flexible thermoplastic tubing 10 as it is unwound from a drum or the like, said tubing being urged over the end of the neck while still intact and then severed with a knife or the like from the main tubing supply, while permitting the ready removal of the threaded toothpaste tube to a remote position so as to permit another toothpaste tube to take its place for similar treatment.

In accordance with one embodiment of the invention, therefore, a feeding and cutting device for initially continuous flexible tubing comprises a rod 13 of ferromagnetic material adapted for insertion in a free end 14 of said tubing, a plurality of continuous-belt conveyors 15 adapted to grip the outer surface of said tubing and urge it away from its storage reel towards the cylindrical protrusion 12 to be capped, a rotary knife 16 adapted to sever said tubing at a region between the free end of said protrusion and the adjacent end of said rod, and magnetic means 17 adapted when energized to urge said rod 13 and hence the free end of said tubing in an axial direction for a pre-set distance away from said protrusion, thereby permitting the latter to be swept clear of the axis of movement of said rod, and means to de-energize said magnetic means thereafter, thus permitting a subsequent engagement of the newly-formed free end of said tubing under the influence of said belt conveyors, with a similar protrusion brought into alignment with said axis.

Preferably, said conveyors are three in number, the two lowermost of the three being disposed approximately 120° apart at a common level, and the third of them being located in a region above the free end of a length of polyethylene or other plastic tubing. Thus, after inserting the ferromagnetic rod 13 until it occupies a position within the tubing 10 which permits the free end thereof to project beyond said rod to an extent approximately equal to or slightly more than the length of the protrusion to be capped as shown in full lines in FIG. 1, the conveyors urge the tubing towards the protrusion and at the same time convey the rod 13 which is gripped therein, this being shown in dotted lines in FIG. 1. To facilitate the initial insertion of the rod, one of said conveyors e.g., the upper one, may be capable of withdrawal on hinged or other means so as to provide ready access to the upper surfaces of the lower two conveyors upon which said tubing, with its enclosed rod, may be laid.

The magnet 17 may be an electro-magnet energized via a switch 18, the operation of which is co-ordinated with the means which operates the knife or other cutter to sever the plastic tubing. The magnet is preferably of such strength that the rod is displaced relative to the conveyor-engaged tubing so that when the next toothpaste tube is aligned with the tubing the free end of the tubing projects beyond the rod as shown in full lines in FIG. 1. In addition, the switch 18 may be co-ordinated with the means which swing the treated toothpaste tube or the like out of the region of the axis of the rod, thereby bringing the next said toothpaste tube into its capping position. The toothpaste tubes are mounted in 120° apart sockets 19 of a turntable 20 swingable about an arbor 21, and this turntable may be moved to and indexed at the 120° apart positions by a suitable drive (not shown).

In modifications of the invention, said electromagnet may be replaced by one or more permanent magnets adapted to move into or out of a position wherein they may readily influence the rod. The rod itself may be replaced by a hollow cylindrical or tubular member, depending upon the weight which the two lower conveyors are capable of supporting. Said conveyors may be provided with conventional endless belts, or with tubular belts to which compressed air or the like is admitted. Said cutting action may be assisted by means 22 adapted to warm and heat shrink to capping length of said plastic tubing and its adjacent co-extensive part immediately after its installation upon said protrusion.

I claim:

1. The apparatus for applying inserts of flexible thermoplastic material to surround the externally screw threaded metal neck of a dispensing tube, means for mounting said tube, means defining an insert applying station comprising means for advancing the tubular open end of a continuous length of tubing of said material to surround said neck, and cutting means for severing a length of tubing at said open end to provide at said station an insert separated from the continuous tubing length and in position to be secured around said threaded neck.

2. In the apparatus defined in claim 1, said mounting being a movable structure having a plurality of sockets for mounting tubes to be indexed in turn at said station.

3. In the apparatus defined in claim 2, said structure being a rotatable turntable.

4. In the apparatus defined in claim 1, a rod mounted a predetermined distance within the open end of said tubing and adapted to be displaced toward said tube neck along with said tubing, and means for displacing said rod away from said tube neck after said insert is severed.

5. In the apparatus defined in claim 4, said rod being of magnetic material, and said means for displacing the rod comprising electromagnetic means having a control switch.

6. In the apparatus defined in claim 1, said means for advancing said tubing comprising conveyor means engaging the external surface of said tubing.

7. In the apparatus defined in claim 1, means at said station for applying heat to said insert.

8. In automatic apparatus for applying covering elements of heat shrinkable synthetic plastics material upon articles, means for successively positioning articles at an element applying station, means for providing and advancing covering elements of predetermined size from the leading tubular open end of a continuous supply of said material toward and upon articles positioned at said station comprising axially displaceable rod means within said tubular leading end and associated means for severing tubular elements of predetermined length from said leading end and advancing said rod and tubing surrounding it toward said station, and means for heat shrinking said elements onto said articles.

9. In automatic apparatus for applying covering elements of heat shrinkable synthetic plastics material upon articles, means for sucessively positioning articles at an element applying station, means for longitudinally advancing the tubular open leading end of a continuous length of tubing of said material toward an article positioned at said station, means at said station for severing a length of tubing from said open end to provide a cylindrical element of desired length separated from said continuous tubing and positioned in predetermined relation upon the article, and means for heat shrinking said element onto the article.

10. In apparatus for applying a covering element of heat shrinkable synthetic plastics material upon the neck of a dispensing container, means for positioning a container at an element applying station, means for longitudinally advancing the tubular open leading end of a continuous length of tubing of said material toward the neck of a container positioned at said station, means at said station for severing a length of tubing from said open end to provide a tubular element of desired length separated from said continuous tubing and positioned in surrounding relation to said neck, and means for heat shrinking said element onto said neck.

11. In the apparatus defined in claim 10, said means for positioning a container at the element applying station comprising intermittently operable means for continually moving containers in sucession into said station, arresting said containers at the element applying station for a time sufficient to receive said covering element and continually moving containers having said elements on their necks away from said station.

12. In the apparatus defined in claim 10, said means for positioning a container at the element applying station comprising a container carrier member at said station in the form of a rotatable drum having parallel longitudinal container body receiving socket grooves on its periphery, said drum being rotatable about an axis parallel to the direction of advance of said tubing and said parts being so constructed and arranged that containers passing through the station are successively located in said drum grooves and then removed therefrom after their necks have received the covering elements.

13. In the apparatus defined in claim 12, intermittent drive means operated in timed relation with said tubing feeding means for periodically unidirectionally rotating said drum through a predetermined arc.

14. In the apparatus defined in claim 10, said tubing advancing means comprising a floating mandrel rod peripherally enclosed within said moving tubing.

15. In the apparatus defined in claim 14, said means for advancing the tubing comprising means periodically gripping a tubing section surrounding said mandrel rod and moving said tubing together with said mandrel rod toward the tube neck positioned for receiving said tubular element.

16. In the apparatus defined in claim 14, said tubing severing means comprising knife edge means synchronized with said tubing advancing means intermittently moved into contact with said tubing during periods that said tubing is longitudinally stationary.

17. In apparatus for applying covering elements of flexible thermoplastic material to surround the externally screw threaded metal neck of a dispensing container, means for mounting said container, means defining an insert applying station comprising means for advancing the tubular open end of a continuous length of tubing of said material toward said neck and coacting means for severing a length of tubing from said open end, whereby to provide at said station a covering element separated from the continuous tubing length and positioned around said threaded neck.

18. Apparatus for applying a covering element of heat shrinkable plastics material upon the externally threaded metal neck of a dispensing container, means for positioning a container at an element applying station, means for advancing the tubular open leading end of a continuous length of tubing of said material toward the neck of a tube positioned at said station, means at said station for severing a length from tubing at said open end to provide a tubular element of desired length separated from said continuous tubing and positioned in surrounding relation to said neck, and means for heat shrinking said element onto said neck.

19. In apparatus for applying inserts of flexible thermoplastic material to surround the externally screw threaded metal neck of a dispensing tube, means for mounting said tube, means defining an insert applying station comprising means for advancing the tubular open end of a continuous length of tubing of said material toward said neck and coacting means for severing a length from tubing at said open end, whereby to provide at said station an insert separated from the continuous tubing length and positioned around said threaded neck.

* * * * *

UNITED STATES PATENT OFFICE
CERTIFICATE OF CORRECTION

Patent No. 3,805,358          Dated April 23, 1974

Inventor(s) Dusan S. Lajovic

It is certified that error appears in the above-identified patent and that said Letters Patent are hereby corrected as shown below:

In the foreign priority data, change "Austria" to --Australia--.

Column 2, line 47, change "The" to --In--.

Column 4, line 45, change "from tubing at" to --of tubing from--.

Column 4, line 57, change "from tubing at" to --of tubing from--.

Signed and sealed this 8th day of October 1974.

(SEAL)
Attest:

McCOY M. GIBSON JR.
Attesting Officer

C. MARSHALL DANN
Commissioner of Patents